United States Patent [19]
Matsumoto

[11] Patent Number: 5,924,814
[45] Date of Patent: Jul. 20, 1999

[54] EXPANDABLE COLUMN POSITIONING MECHANISM

[75] Inventor: Tadashi Matsumoto, Tokyo, Japan

[73] Assignee: Mitsubishi Denki Kabushiki Kaisha, Japan

[21] Appl. No.: 08/756,393

[22] Filed: Nov. 27, 1996

[30] Foreign Application Priority Data

Apr. 23, 1996 [JP] Japan ................................ 8-101374

[51] Int. Cl.⁶ ...................................................... F16B 7/10
[52] U.S. Cl. ........................ 403/105; 403/109.3; 403/108
[58] Field of Search ............................... 403/104, 105, 403/106, 107, 108, 109.1, 109.2, 109.3, 109.8, 377, 329; 248/297.31, 354.1, 354.6, 354.7, 408

[56] References Cited

U.S. PATENT DOCUMENTS

| | | | |
|---|---|---|---|
| 1,085,543 | 1/1914 | Collins | 403/329 X |
| 1,320,613 | 11/1919 | Gilcrease | 403/105 X |
| 1,343,279 | 6/1920 | Reynolds | 403/108 X |
| 3,145,965 | 8/1964 | Stein | 248/408 |
| 3,704,850 | 12/1972 | Hendrickson et al. | 403/108 X |
| 4,012,158 | 3/1977 | Harper | 403/107 |
| 4,036,525 | 7/1977 | Howk | 403/106 X |
| 4,047,353 | 9/1977 | Aarons | 403/107 X |
| 4,329,078 | 5/1982 | Crates et al. | 403/329 X |
| 4,586,399 | 5/1986 | Kassai | 403/108 X |
| 5,281,045 | 1/1994 | Ichikawa | 403/329 |

FOREIGN PATENT DOCUMENTS 5-53060  3/1993  Japan .
90 12519  11/1990  WIPO .

*Primary Examiner*—Harry C. Kim
*Attorney, Agent, or Firm*—Rothwell, Figg, Ernst & Kurz, p.c.

[57] ABSTRACT

An expandable column 10 is accommodated in an accommodating hole 12a so as to freely advance therefrom and retract thereinto. The expandable column 10 has a plurality of holes 11 disposed thereon in the advancing and retracting direction thereof. An actuating piece 13 extends from an end of a fixed frame 12 in the advancing and retracting direction of the expandable column 10. The actuating piece 13 has elasticity and is formed to be swingable using the connecting portion thereof with the fixed frame 12 as a fulcrum and further has a pin 14 formed thereto and engaged with holes 11. The expandable column 10 is positioned by the engagement of one of the holes 11 with the pin 14 and the engaged state of both the hole 11 and the pin 14 is released by the swing motion of the actuating piece 13, so that the expandable column 10 can be expanded and retracted.

2 Claims, 2 Drawing Sheets

EXPANDABLE COLUMN POSITIONING MECHANISM

BACKGROUND OF THE INVENTION

1. Field of the Invention

The present invention relates to an expandable column positioning mechanism for, for example, setting the elevation angle of the antenna of a portable satellite communication terminal.

2. Description of the Related Art

FIG. 3 is a cross sectional view of the main portion of a positioning mechanism for the lens barrel of a conventional microscope disclosed in, for example, Japanese Patent Application Laid-Open No. 5-53060.

In the drawing, a lens barrel 1 is accommodated in an outer cylinder 2 so as to freely advance therefrom and retract thereinto. A ratchet 3 extends on the peripheral surface of the cylinder 2 in the advancing and retracting direction of the lens barrel 1. A claw portion member 4 to be engaged with the ratchet 3 is attached to the outer cylinder 2 so as to turn on a shaft 5. The claw portion member 4 is urged by a spring sheet 6 in a direction where a claw portion 4a formed on an end thereof is engaged with the ratchet 3. Further, there is disposed an operation rod 7 for disengaging the claw portion 4a from the ratchet 3 by pressing the other end of the claw portion member 4.

Next, operation of the conventional lens barrel positioning mechanism will be described.

The claw portion member 4 turns counterclockwise in FIG. 3 on the shaft 5 by the urging force of the spring sheet 6 so that the claw portion 4a is abutted against the ratchet 3. Then, the claw portion 4a is engaged with the tooth portion 3a of the ratchet 3.

When the lens barrel 1 is to move in a direction A with respect to the outer cylinder 2, the claw portion 4a is pushed upward by the tooth portion 3a of the ratchet 3, thereby the claw portion member 4 is rotated clockwise on the shaft 5. When the claw portion 4a goes beyond the tooth portion 3a, the claw portion member 4 turns counterclockwise on the shaft 5 by the urging force of the spring sheet 6 so that the claw portion 4a is engaged with the next tooth portion 3a. With this operation, the lens barrel 1 moves in the direction A with respect to the outer cylinder 2.

When the lens barrel 1 is to move in a direction B with respect to the outer cylinder 2, the tooth portion 3a of the ratchet 3 is abutted against the claw portion 4a and prevented from further movement.

Further, when the other end of the claw portion member 4 is pushed by the operation rod 7, the claw portion member 4 turns clockwise on the shaft 5. Thus, the claw portion 4a is disengaged from the tooth portion 3a. In this state, the lens barrel 1 can move in the directions A and B with respect to the outer cylinder 2.

Since the conventional lens barrel positioning mechanism is arranged as described above, there is a problem that the number of components is increased and the power transmission efficiency thereof is lowered.

Further, there are many movable portions such as the claw portion member 4, the operation rod 7 and the like. When a foreign matter enters between the claw portion member 4 and the outer cylinder 2, the claw portion member 4 and the shaft 5, the operation rod 7 and a guide for guiding the rod (not shown), and the like, the operation of the claw portion member 4 and the operation rod 7 is disturbed. Thus there also arises a problem that a maintenance job such as cleaning, oiling and the like are needed to achieve stable operation for a long time.

SUMMARY OF THE INVENTION

An object of the present invention made to solve the aforesaid problems is to provide an expandable column positioning mechanism capable of improving the reliability of the operation thereof by reducing the number of components without the need of movable portions and a maintenance job.

In order to achieve the above object, according to one aspect of the present invention, there is provided an expandable column positioning mechanism which comprises a fixed frame, an expandable column accomodated to the fixed frame so as to freely advance therefrom and retract thereinto, an actuating piece made of an elastic member and extending from the fixed frame along the expandable column in the advancing and retracting direction thereof, the actuating piece being swingable using the connecting portion of the actuating piece with the fixed frame as a fulcrum, a projection provided with any one of the actuating piece and the expandable column, and a plurality of recessed portions disposed on the other of the actuating piece and the expandable column in the advancing and retracting direction of the expandable column and with and from which the projection is engaged and disengaged by the swing motion of the actuating piece.

DESCRIPTION OF PREFERRED EMBODIMENTS

Embodiments of the present invention will be described below.

Embodiment 1

Figure 1:
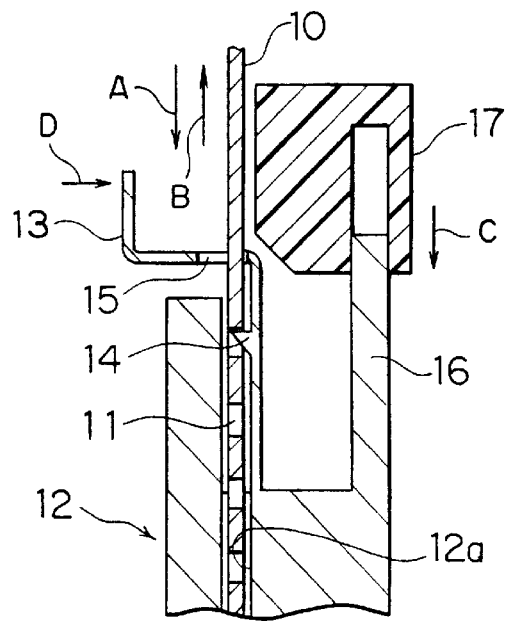
FIG. 1 is a cross sectional view showing the main portion of an expandable column positioning mechanism according to an embodiment of the present invention.
Figure 2:
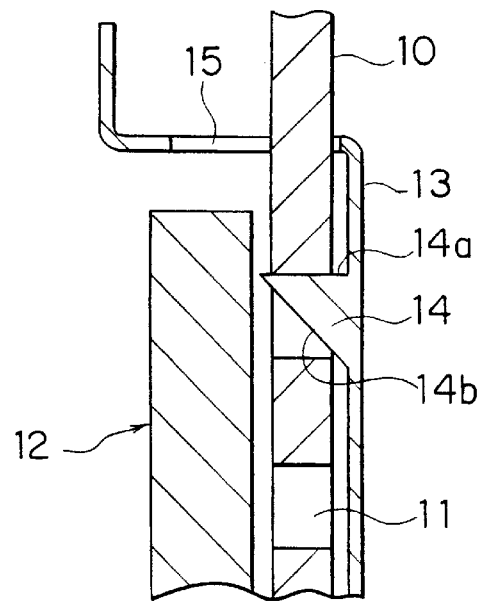
FIG. 2 is an enlarged cross sectional view of the main portion of FIG. 1.
Figure 3:
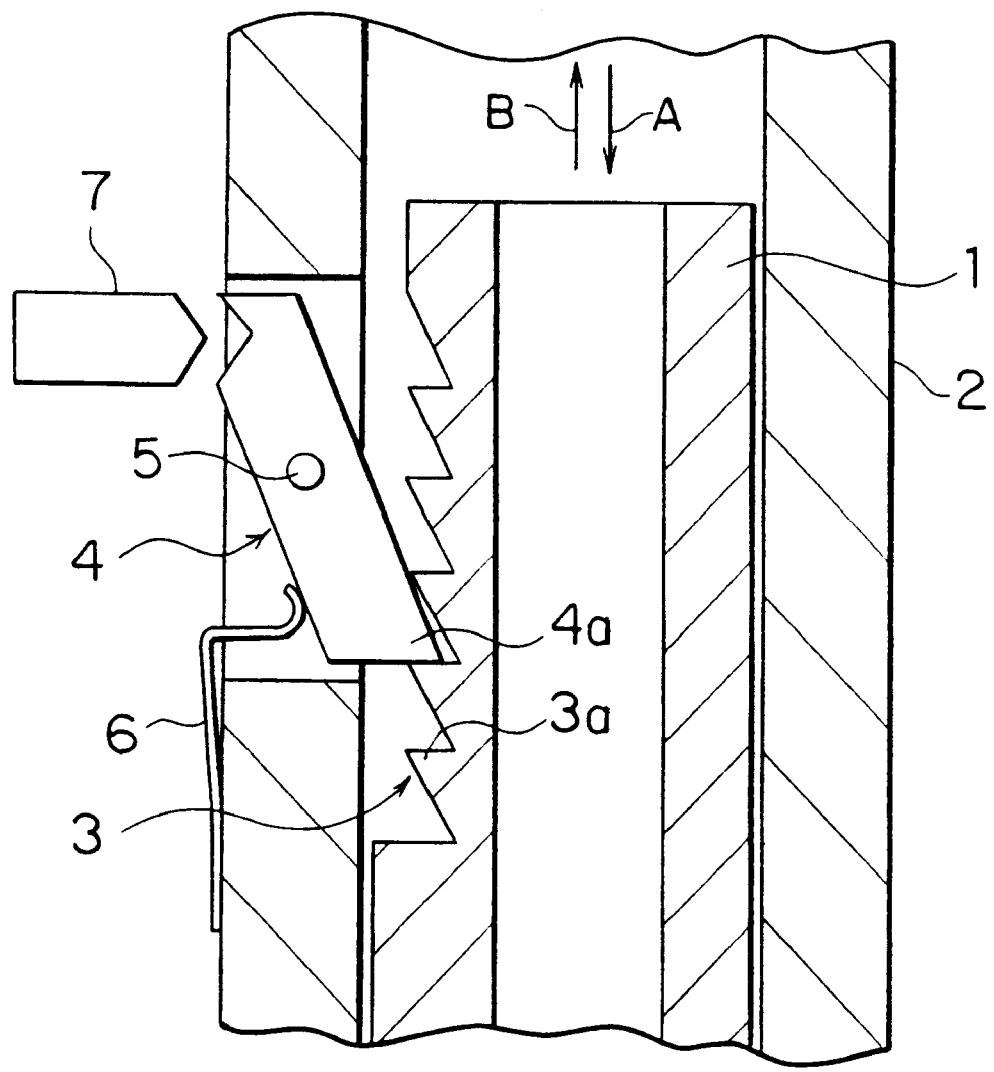
FIG. 3 is a cross sectional view showing the main portion of a conventional lens barrel positioning mechanism in a microscope.

FIG. 1 is a cross sectional view showing the main portion of an expandable column positioning mechanism according to an embodiment of the present invention and FIG. 2 is an enlarged cross sectional view of FIG. 1.

In the drawings, an expandable column 10 is a long flat sheet made of stainless steel and having a plurality of holes 11 as recesses defined at predetermined intervals in the lengthwise direction (advancing and retracting direction) thereof. A fixed frame 12 is formed to a long cylindrical member having a rectangular cross section and made of stainless steel and formed such that the expandable column 10 can be accommodated in an accommodating hole 12a as the hollow portion of the cylindrical member so as to freely advance therefrom and retract thereinto. An actuating piece 13 is formed at an end of the fixed frame 12 integrally therewith. The actuating piece 13 is formed to such a shape that it extends from the one end of the fixed frame 12 in the lengthwise direction thereof, then bends and crosses the upper portion of the accommodating holes 12a and thereafter bends and extends in the lengthwise direction of the fixed frame 12. A pin 14 as a projection to be engaged with the holes 11 is disposed so as to confront the expandable column 10 at the position of the actuating piece 13 extended from the fixed frame 12. Further, an opening 15 through which the expandable column 10 is inserted is disposed on the actuating piece 13 so as to cross the upper portion of the accommodating holes 12a. Further, a support plate 16 extends from an end of the fixed frame 12 in the lengthwise direction thereof side by side with the actuating piece 13. A fastener 17 as a wedge member is detachably mounted to the support plate 16 and urges the actuating piece 13 to the expandable column 10 side.

The actuating piece 13 having elasticity is made of stainless steel and formed to be capable of swinging using the portion where it is connected to the fixed frame 12 as a fulcrum and takes a such a posture that the pin 14 is engaged with one of the holes 11 in a steady state. Further, the pin 14 is formed to have a triangular cross section including an abutted surface 14a to be engaged with the inner wall surface of the hole 11 when the expandable column 10 retracts and an inclined surface 14b to be engaged with the opening edge of the hole 11 when the expandable column 10 extends. Note, the abutted surface 14a is perpendicular to the direction in which the expandable column 10 advances and retracts. The inclined surface 14b is inclined to the advancing and retracting direction of the expandable column 10.

Next, operation of the embodiment 1 will be described below.

The expandable column 10 inserted into the opening 15 of the actuating piece 13 and then inserted into the accommodating hole 12a. At the time, the extreme end side of the actuating piece 13 is pressed in the direction D in FIG. 1 and the actuating piece 13 is inclined using the connecting portion thereof to the fixed frame 12 as the fulcrum and separated from the expandable column 10 to prevent the hole 11 from being engaged with the pin 14. After the expandable column 10 is accommodated in the fixed frame 12, the press of the extreme end of the actuating piece 13 is stopped. Thus, the actuating piece 13 returns to its original state by the elasticity thereof and approaches to the expandable column 10. Then, the pin 14 is inserted into the hole 11.

When the expandable column 10 is to be extended, it is pulled in the direction B. Thus, the expandable column 10 moves in the direction B while causing the opening edge of the hole 11 to slide on the inclined surface 14b of the pin 14 and the actuating piece 13 to be separated from the expandable column 10. When the opening edge of the hole 11 has passed through the inclining surface 14b of the pin 14, the expandable column 10 moves in the direction B while the outer peripheral wall surface thereof slides the extreme end of the pin 14. When the next hole 11 reaches the extreme end position of the pin 14, the actuating piece 13 returns to its original state by the elasticity thereof and the pin 14 is inserted into the hole 11. The expandable column 10 can be extended a predetermined length from the fixed frame 12 by the aforesaid manner.

When the expandable column 10 is pressed in the direction A, the inner wall surface of the hole 11 is abutted against the abutted surface 14a of the pin 14, thus the further movement thereof is prevented.

Next, the fastener 17 is inserted into the support plate 16 in a direction C and mounted thereto. The fastener 17 is abutted against the side of the actuating piece 13 extending from the fixed frame 12 and presses the actuating piece 13 to the expandable column 10 side. Thus, even if the extreme end of the actuating piece 13 is pressed in a direction D, the actuating piece 13 is not inclined in the direction where it is separated from the expandable column 10 using the connecting portion thereof to the fixed frame 12 as a fulcrum, so that the hole 11 is kept in the engaging state with the pin 14.

Further, when the expandable column 10 is to be contracted, the fastener 17 is removed. Then, the extreme end of the actuating piece 13 is pressed in the direction D and the actuating piece 13 is inclined in the direction where it is separated from the expandable column 10 using the connecting portion of the actuating piece 13 with the fixed frame 12 as a fulcrum so as to disengage the hole 11 from the pin 14. The expandable column 10 is contracted by pressing it in the direction A while keeping the disengaged state.

As described above, the positioning mechanism of the expandable column 10 according to the embodiment 1 is arranged such that the expandable column 10 is accommodated in the accommodating hole 12a of the fixed frame 12 so as to freely advance therefrom and retract thereinto, the plurality of holes 11 are disposed on the expandable column 10 along the direction in which the expandable column 10 advances and retracts and the elastic actuating piece 13 having the pin 14 to be engaged with the holes 11 is disposed to the fixed frame 12 integrally therewith. Thus, the pin 14 is disengaged from the hole 11 by pressing the actuating piece 13 in the direction toward which it is separated from the expandable column 10, so that the expandable column 10 is easily expanded from and contacted into the fixed frame 12. Further, when the press of the actuating piece 13 is stopped, the actuating piece 13 returns to its original state by the elasticity thereof, the pin 14 is engaged with the hole 11 and the expandable column 10 is positioned and fixed to the fixed frame 12. Therefore, there can be obtained the expandable column positioning mechanism which operates stably for a long time and in which the number of components is reduced, the efficiency for transmitting the movement thereof is not lowered and further no movable portion is used and no maintenance job is required.

Further, since the pin 14 is formed to have the triangular cross section composed of the abutted surface 14a and the inclined surface 14b, the expandable column 10 can be expanded and contracted without the need of swinging the actuating piece 13 for releasing the engaged state of the holes 11 with the pin 14, thus operability can be improved accordingly.

Further, since there is provided the fastener 17, the swing of the actuating piece 13 is prevented by the fastener 17, whereby the hole 11 can be securely engaged with the pin 14, so that the expandable column 10 can be securely positioned and fixed.

Embodiment 2

Although the plurality of holes 11 are disposed on the expandable column 10 in the direction to and from which the expandable column 10 advances and retracts and the pin 14 is provided with the actuating piece 13 in the embodiment 1, the same advantage can be obtained by an embodiment 2 arranged such that a pin 14 is provided with an expandable column 10 and a plurality of holes 11 are disposed on the actuating piece 13 in the direction to and from which the expandable column 10 advances and retracts.

Embodiment 3

Although the pin 14 is formed to have the triangular cross section including the abutted surface 14a to be engaged with the inner wall surface of the hole 11 when the expandable column 10 retracts and the inclined surface 14b to be engaged with the opening edge of the hole 11 when the expandable column 10 extends in the embodiment 1, the same advantage can be obtained by an embodiment 3 arranged such that a pin is formed to have a triangular cross section including an abutted surface to be engaged with the inner surface of a hole 11 when an expandable column 10 expands and an inclined surface to be engaged with the opening edge of the hole 11 when the expandable column 10 contracts.

Embodiment 4

Although the pin 14 is formed to have the triangular cross section composed of the abutted surface 14a and the inclined surface inclining surface 14b in the embodiment 1, the pin in an embodiment 4 is formed to a rectangular parallelepiped having a rectangular cross section.

In this case, no inclined surface is formed to a projection, the advancing and retracting operation of an expandable column 10 is prevented when a hole is engaged with the pin, thus the expandable column 10 can be more securely positioned.

Note, although the pin is formed to the rectangular parallelepiped having the rectangular cross section in the embodiment 4, the pin is not limited to the rectangular parallelepiped and may be formed to a pillar.

Although recesses serve as the holes 11 in the above respective embodiments, the recesses are not limited to the holes and may be formed recessed grooves.

Further, the expandable column 10 is made of the flat sheet in the above respective embodiments, it may be composed of a pillar. In this case, it suffices only to form the accommodating hole 12a of the fixed frame 12 to a hole shape corresponding to the outside diameter shape of the expandable column 10. The rotation of the expandable column 10 caused when it advances and contracts can be prevented and the hole 11 is securely engaged with the pin 14 by the provision of a groove extending in the advancing and retracting direction of the expandable column 10 on the outer peripheral surface thereof and the provision of a pin with the fixed frame 12 which guides the advancing and retracting operation of the expandable column 10 by being engaged with the groove.

As described above, according to the present invention, there can be obtained the following advantages.

First, since an expandable column positioning mechanism comprises a fixed frame, an expandable column accommodated to the fixed frame so as to freely advance therefrom and retract thereinto, an actuating piece made of an elastic member and extending from the fixed frame along the expandable column in the advancing and retracting direction thereof, the actuating piece being swingable using the connecting portion of the actuating piece with the fixed frame as a fulcrum, a projection provided with any one of the actuating piece and the expandable column, and a plurality of recessed portions disposed on the other of the actuating piece and the expandable column in the advancing and retracting direction of the expandable column and with and from which the projection is engaged and disengaged by the swing motion of the actuating piece, the expandable column positioning mechanism can improve the reliability of the operation thereof by reducing the number of components without the need of movable portions and a maintenance job.

Second, since a surface of the projection in the advancing and retracting direction of the expandable column is formed to a plane perpendicular to the advancing and retracting direction and the other surface of the projection is formed to an inclined surface inclined with respect to the advancing and retracting direction, one of the advancing and retracting motions of the expandable column can be executed without swinging the actuating piece, so that operability can be improved.

Third, since the projection has a rectangular cross sectional shape formed in the advancing and retracting direction of the expandable column, the advancing and retracting motions of the expanding column is prevented unless the actuating piece is swung, so that the expandable column can be securely positioned.

Fourth, since there are provided a support plate standing from the fixed frame side by side with the actuating piece and a wedge member detachably mounted to the support plate, wherein the swing motion of the actuating member is prevented by the wedge member mounted to the support plate, the positioned expandable column can be securely fixed.

What is claimed is:

1. An expandable column positioning mechanism, comprising:

a fixed frame;

an expandable column accommodated to said fixed frame so as to freely advance therefrom and retract thereinto;

an actuating piece made of an elastic member and having a connecting portion extending from said fixed frame along said expandable column in the advancing and retracting direction thereof, said actuating piece being swingable using the connecting portion of said actuating piece with said fixed frame as a fulcrum;

a projection provided with any one of said actuating piece and said expandable column;

a plurality of recessed portions disposed on the other of said actuating piece and said expandable column in the advancing and retracting direction of said expandable column and with and from which said projection is engaged and disengaged by the swing motion of said actuating piece;

a support plate standing from said fixed frame side by side with said actuating piece; and;

a wedge member detachably mounted to said support plate, wherein the swing motion of said actuating piece member is prevented by said wedge member mounted to said support plate.

2. An expandable column according to claim 1, wherein a surface of said projection in the advancing and retracting direction of said expandable column positioning mechanism is formed to a plane perpendicular to the advancing and retracting direction and the other surface of said projection is formed to an inclined surface inclined with respect to said advancing and retracting direction.

* * * * *